Dec. 8, 1964 A. W. HOLT 3,160,855

DOUBLES DECISION DETECTOR FOR READING MACHINES

Filed Sept. 18, 1961 2 Sheets-Sheet 1

INVENTOR
Arthur W. Holt
BY Joseph A. Genovese & Max L. Libman
ATTORNEYS

Dec. 8, 1964 A. W. HOLT 3,160,855

DOUBLES DECISION DETECTOR FOR READING MACHINES

Filed Sept. 18, 1961 2 Sheets-Sheet 2

INVENTOR

Arthur W. Holt

BY Joseph A. Genovese & Max L. Libman

ATTORNEYS

United States Patent Office 3,160,855
Patented Dec. 8, 1964

3,160,855

DOUBLES DECISION DETECTOR FOR READING MACHINES

Arthur W. Holt, Silver Spring, Md., assignor, by mesne assignments, to Control Data Corporation, Minneapolis, Minn., a corporation of Minnesota Filed Sept. 18, 1961, Ser. No. 138,916
14 Claims. (Cl. 340—146.3)

This invention relates to character reading machines and particularly to improvements in the decision section of such machines.

The term "character" as used herein means letters, numbers, symbols, patterns and/or portions thereof capable of being identified by a machine.

The general operating procedure of a reading machine is as follows: The unknown characters are individually scanned, and the scanner provides output data peculiar to the configuration of each character. This data is processed and fed to a decision section of a machine which identifies each character. The decision sections of reading machines may vary in configuration and philosophy but the ultimate purpose (to identify the characters) is the same. For instance, the decision section of certain machines may function on an absolute principle, i.e., all of its inputs for a given character must be satisfied before the comparator thereof determines the identity of a character. Other machines operate on a "best of match" principle (Rabinow Patent No. 2,933,246) where the comparator decides upon the identity of a character on the basis that is more like a given character than any other.

When print is poor, sometimes a character is so mutilated that it appears to the machine (and often to the eye) as much like one character as another. An example of this would be an E with a badly mutilated or almost missing lower horizontal part. Such a character would be almost as much an F as an E. The comparator of an absolute decision and a best of match decision machine will, under such circumstances have difficulty in determining the identity of such a character. Some machines would determine that the character is both an E and an F in which case the ultimate output to a utilization device, e.g., a computer, buffer, printer, etc., would be ambiguous or erroneous. Accordingly, an object of my invention is to provide means for detecting a "doubles" condition and for providing a signal indicative of such a condition. I use the term "doubles" to mean plural identity of a single character, where the plurality may be two or more concurrent, different identities of the same character.

Once the doubles signal is made available it may serve many useful purposes, one of which is to inhibit all of the concurrent character-identity signals so that they do not reach the utilization device. Another purpose of the doubles signal is to manifest an alarm; and still another purpose is to operate a printer to mark the document which is being read or separate record; and yet another possible use of the doubles signal is to provide a mark of any type in the utilization device to take the place of the ambiguous character.

Since the machine inherently has narrowed down the possible identity of a character when a doubles signal occurs, and this information is useful, I have means to remember the identities of the machine-decisions. In other words, when a doubles signal occurs, it is only because the machine has decided that a given character is one of a possible two, three or more given characters. All other characters capable of being read by the machine are therefore excluded. An example of the utility of remembering the identity of the two or more characters which cause the doubles signal, is found in copending application Serial Number 138,766 of Rabinow and Holt, entitled Reading System With Dictionary Look-Up.

Although my present invention has general application and may be used with numerous reading machines, the illustrated embodiment of my invention deals with the comparator disclosed in copending application Serial Number 32,911, now Patent No. 3,104,369, of Rabinow et al. One of the comparators disclosed in that application has a circuit with a single comparator transistor for each of the unknown characters. The comparator circuit is fully described in that application and is not repeated in detail here, except to mention that the comparator has a current line connected in parallel to the emitters of each of the comparator transistors. The current conducted on this line may be roughly considered as providing a bias for each transistor. The input signal to each comparator transistor is a function of the degree of match of the unknown character and a pre-wired criterion for the characters that the machine is capable of identifying. Thus, adjusting the current in the above line will also adjust the required difference between input signals to identify the characters.

Accordingly, a further object of my present invention is to provide means, for instance, an adjustable current supply for the aforesaid emitters of the comparator transistors, to adjust the required tolerance, or difference between the comparator transistor input signals before one of the comparator transistors will operate to provide a character-identity output signal.

In brief, one feature of my invention is to detect a doubles condition, i.e. when the comparator decides that a given unknown character is very similar to more than one criterion for the characters that the machine is expected to read. Another feature of my invention is to provide means for adjusting the required differences between characters before the machine comparator decides that the unknown is actually one character or another or that the machine should determine that the character is not sufficiently defined as any single character. Thus, I am able to adjust the certainty at which character-identity is made.

Other objects and features of importance will become apparent in following the description of the illustrated forms of the invention which are given by way of example only.

FIGURE 1 is a wiring diagram showing portions of a reading machine comparator and showing my doubles detector and memory for temporarily remembering the identity of the doubles characters.

FIGURE 1*a* shows a group of characters which are so poorly printed that it is likely that a reading machine would have difficulty in distinguishing them as E, F and P respectively.

Figure 1:
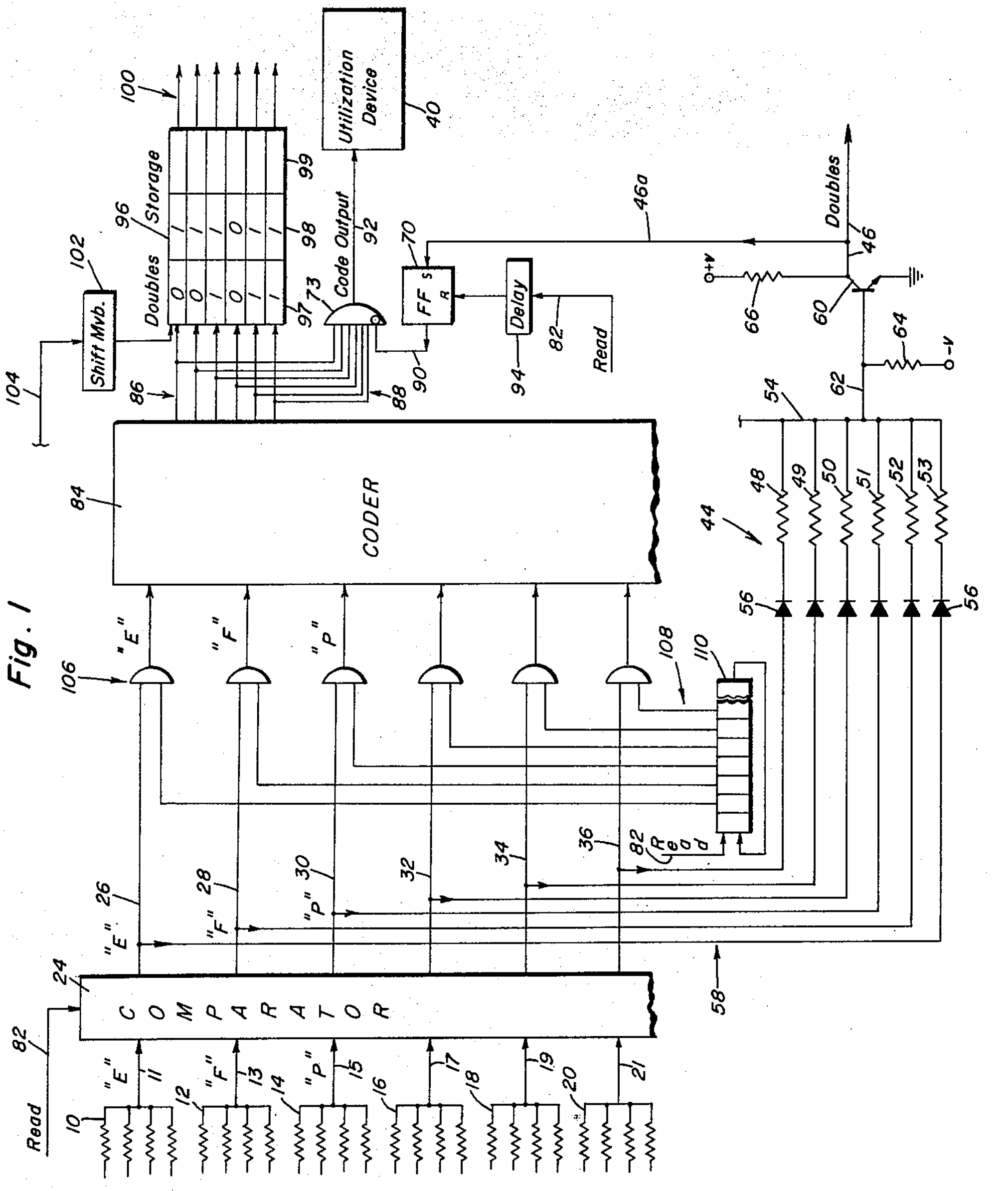

To simplify the understanding of my invention and how it serves various useful purposes in the art of character reading by machine, attention is directed to the Rabinow et al. pending application Serial No. 32,911, which discloses a reading machine that has been constructed and operated. Although the reading machine disclosed in that application is referred to, it is emphasized that the principles of my invention apply to other reading machines and to reading machines which operate on different principles from that of the Rabinow et al. pending application.

In general, the reading machine disclosed in the Rabinow et al. pending application is an optical reading machine where unknown characters are individually scanned with the scanner providing output data corresponding to the configuration of each character. These data are processed in such a way that signals are developed which represent the degree of match of the unknown scanned character with predetermined criteria. The criteria are established by resistor matrices such as matrices 10, 12, 14, 16, 18 and 20 shown in FIGURE 1 herein. For a complete understanding of the reading machine, and particularly the part thereof between the scanner and the output wires 11, 13, 15, 17, 19 and 21 of the matrices, reference is made to the copending application. For the purposes of my invention it is sufficient to know that the output wires 11–21 inclusive (there being one for each character) conduct signals (called "match voltages" in the copending application) which correspond to the degree of match between the scanned unknown character and the resistors in each of the matrices for all characters that the machine is expected to recognize.

The match voltages on lines 11–21, etc., are applied to a comparator 24 which selects the "best" (highest, lowest, nearest to zero, etc.), and provides an output on only one of the output conductors, e.g., conductors 26, 28, 30, 32, 34, 36, etc., from the comparator, there being one such conductor for each character. The comparator 24 is triggered by a "read" signal on line 82 (the same number used for the same line in the application Serial No. 32,911) and this signal occurs when each character is completely scanned.

Summarizing, when an unknown character is scanned by the machine, one of the output wires 26–36 conducts a signal, while the others conduct no signal, if the machine is capable of identifying the unknown character. The signals identifying the individual characters are ultimately applied to a utilization device 40, for instance a buffer, a computer, a printer, a display, etc.

Figure 1A:
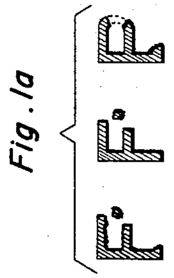

It sometimes happens that the reading machine and specifically the comparator 24, is incapable of distinguishing a character from all possible characters, but the machine is able to determine that the unknown character is one of two or three possible characters. For instance, FIGURE 1*a* shows three characters, each of which may be an E, an F or possibly a P. I will later describe a typical cycle of operation of my invention where the reading machine cannot distinguish the unknown character between an E and an F, but does exclude all other characters as possibilities. It is not uncommon for ordinary print, including press printing and typewritten print (especially carbon copies) to be of such low quality that pieces of the characters are smudged or missing so that the machine cannot ascertain with reasonable certainty, the identity of the character. Parenthetically, a human being would probably have considerable difficulty in identifying such characters if it were not for the fact that most characters in our language are printed as portions of words and it is quite immaterial whether the identity of one character is or is not known.

*Doubles Detector*

In the operation of a reading machine having comparator 24, the identification of individual characters without confusion presents no problem. When a character is identified only one of the output lines 26–36 conducts a signal and by knowing which character the line represents, the character-identity information may be fed to a utilization device 40. However, when a doubles situation occurs, meaning that two or more of the lines 26–36 will conduct an identical signal, it is impossible to make a final decision as to the identity of the unknown character. Therefore I have provided a doubles detector 44 (lower part of FIGURE 1) which produces an output signal on line 46 when two or more of the lines 26–36 conduct a character-identity signal. The circuit 44 is composed on an analog adder made of resistors 48–53 inclusive (there being one resistor for each output line 26–36) connected in parallel with a buss 54.

A undirectional device, for instance, diode 56 is interposed in each line of the group 58 and each diode is connected at one end to each of the resistors 48–53 and at the other end of the individual character-identity signal lines 26–36.

A transistor 60, or the equivalent, is base-connected by line 62 with buss 54, and there is a negative source of voltage connected by resistor 64 with the line 62. A positive source of voltage is connected through resistor 66 to the emitter of the transistor, and the doubles signal line 46 is also connected to the emitter. The collector of the transistor goes to ground. The negative and positive sources of potential and resistor values at 64 and 66 are so selected that a signal on any one of the lines 58 through its resistor 48–53 will be insufficient to saturate the transistor 60. However, when there are signals on any two of the lines, the corresponding two resistors of the group 48–53, become paralleled so that the effective resistance of the resistors therein is considerably reduced. Thus, the voltage on line 54 will be increased, causing the transistor 60 to conduct and provide a "doubles" signal on line 46. Accordingly, my doubles detector will yield a signal on line 46 whenever the reading machine comparator decides that a character is sufficiently like more than one of the character-criteria to be considered more than one character.

The signal on line 46 is greatly useful, and I have shown only two (FIGURES 1 and 3) of the many possible uses thereof. Double signal line **46*a* is attached to line 46 and is used to set a flip flop 70 to provide an inhibit signal for inhibit AND gate 73. The inhibit AND gate (as will be described in detail later) prevents the utilization device 40 from receiving any character-identity signal when there is a "doubles" situation. The doubles signal on line 46 can also be used as in application Serial Number 138,777, entitled Self-Programming Pattern Recognition Machine, and in the application of Rabinow-Holt. Other uses of the doubles signal would be to manifest the same optically on a display and/or mark the document being read, provide an "ignore" symbol in the device 40**, etc.

The circuit of comparator 24 is fully disclosed in copending application Serial Number 32,911. Thus, I have shown only a portion 71 (FIGURE 2) of the circuit to illustrate how one of the features of this invention operates with that comparator circuit or the comparator circuit of other reading machines encountering doubles problems. Upon study of the comparator in application number 32,911 it will be seen that the line 79 of FIGURE 2 therein is a current carrying line for the comparator transistors 72 (one reproduced herein in FIGURE 2). The comparator circuit is so constructed that the line 79 conducts current through resistor 76 (FIGURE 3 of the copending application) from a plus 13.5 v. source. By changing the current in line 76, I also correspondingly adjust the amount of difference between input signals on lines 11–21 required for a comparator transistor, e.g., transistor 72, to fire. Thus, the adjustable resistance shown at 80 in FIGURE 2 herein, adjusts the difference required in the match voltage signals before the comparator will identify an unknown character or conclude that the character is one of a group of two or more similar characters (thereby providing an output signal on more than one of the group of lines 26–36). Thus, adjustable resistor 80 is interposed between the plus 13.5 volt input source to line 79 and the current resistor 76. The effect of this circuit is to produce a "constant current" supply whose value can be varied by variable resistor 80. Summarizing, my detector 44 will provide a signal indicating a doubles situation. The improvement shown in FIGURE 2 will make it possible to adjust the amount of difference demanded by the comparator 24 to conclude that the match voltage signals on the incoming lines to the comparator sufficiently define a character.

*Doubles Memory*

If one is unconcerned with an occasional error caused by a doubles situation, the doubles detector 44 would not be essential.

Figure 2:
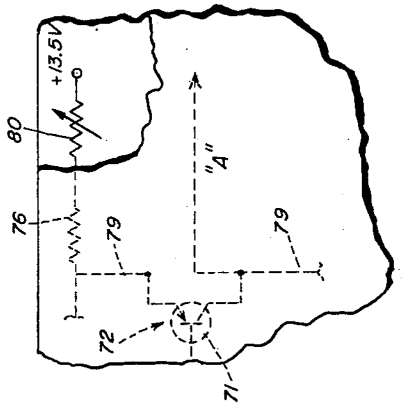
FIGURE 2 is a fragmentary elevational view of the comparator disclosed in application Serial No. 32,911, now Patent No. 3,104,369, and showing also the means which I provide for adjusting the minimum acceptable differentiation between the characters before the comparator will distinguish between similarly appearing characters, for instance the group shown in FIGURE 1*a*.

However, to maximize the usefulness and dependability of a reading machine my doubles detector is of great value. It also has other very useful purposes as disclosed in the applications entitled Self-Programming Reading Machine and Reading Machine With Dictionary Look-Up. The minimum acceptable differential level adjustment shown in FIGURE 2 is of considerable importance whether or not a doubles detector 44 is used in conjunction with a reading machine. This feature makes it possible to adjust the comparator to suit different qualities of print.

When a doubles detector is used, it is sometimes sufficient to simply inhibit the signals on the character-identity lines 26–36 so that no signal reaches utilization device 40 when an ambiguous unknown character is attempted to be identified by the machine. Indeed, the doubles detector signal line 46 can be used to provide an artificial signal to the utilization device, e.g., an ignore or error signal so that a computer or the like equipment will know that a character fits in a particular place but was unable to be identified by machine. It is also useful to know the identity of the two or more characters involved when the reading machine provides a doubles situation. Therefore FIGURE 1 shows an encoder 84 fed by signals ultimately derived from lines 26–36 inclusive. The encoder is conventional and it provides a six, eight, etc., bit code corresponding to the input character-identity signal. For instance, if the line 26 were responsible for operating the encoder 84, a different binary code would be produced by the encoder. If another line, say line 34 were responsible for operating the encoder 84, a different binary code would be the output of the encoder. The group of lines 86 conducts the bit information from the encoder. The group 88 of lines are connected to lines 86, and these provide individual inputs to the inhibited gate 73 which has been mentioned previously. Gate 73 diagrammatically illustrates individual AND gates each of which is inhibited, i.e., there being one AND gate for each line of group 88 and one inhibit terminal for the output line 90 of flip flop 70. If the flip flop is not set there will be no signal on line 90 whereby the outputs in binary code conducted on lines 86, 88 will pass gate 73 and be conducted on the conductors of cable 92 to the utilization device 40. However, during the identity of a character if the doubles detector 44 provides an output signal, the flip flop 70 will be set by a signal on line 46*a* thereby providing an inhibit signal on line 90 so that the character-code cannot pass to the utilization device 40. The flip flop 70 can be reset in a number of ways, the easiest to demonstrate being the "read" signal on line 82 with a delay 94 interposed therein and of such duration that a given character is completely scanned and the decision thereon made, before the flip flop 70 is reset.

Lines 86 are applied to a shift register storage 96 whose stages 97, 98 and 99 (there being any number of stages) are each capable of storing a binary code to define a character. The output lines 100 of storage 96 may be used to display or to serve other functions such as described in the copending applications of Rabinow and Rabinow-Holt mentioned previously herein. The shift register storage 96 is unloaded by any suitable means such as a shift multivibrator 102 which is triggered by one of a variety of signals such as a delayed "read" signal on line 104 (the same as line 82) a clock signal, a "begin new character" signal or the like.

The only other function to be discussed herein is the solution to the problem that the encoder 84 being conventional, will provide a code output on lines 86 when a single signal is applied on any of the lines 26–36 inclusive. If signals are concurrently received by the encoder there will have to be some means for the encoder to select one incoming signal, provide a code identifying the character, and then select another signal. I have shown two ways of solving this problem. In FIGURE 1 I have a group of AND gates 106 which gate the signals on lines 26–36 sequentially into the encoder 84 during the "read" signal on line 82 to comparator 24. The gates 106 are interposed in lines 26–36 whereby one of these lines provides a single input to each individual gate. The other inputs of the gates 106 are on lines 108 which occur sequentially in response to a "read" signal on line 82 applied to ring counter 110. There are many ways of producing sequential signals to interrogate sequential gate 106, and the conventional ring counter 110 is given as an example. When a counter is used lines 108 are connected to the successive stages of the counter.

Summarizing the operation of this phase of my invention, assume that a character is scanned and the machine cannot determine with reasonable certainty (in accordance with the adjustment of resistor 80) whether the character is an E or an F. Thus, there will be concurrent signals on lines 26 and 28 thereby causing the detector 44 to yield a doubles signal on line 46*a*. This signal sets the flip flops 70 to inhibit gate 73.

The "read" signal triggers the ring counter 110 so that the gates 106 are sequentially interrogated. The gate for line 26 will be interrogated first so that the encoder 84 will receive only one signal, i.e., on the "E" line. Thus, a code for the character E will be provided on lines 86, 88 toward utilization device 40 but will be inhibited by gate 73 before they reach utilization device. The "E" signal on lines 86 will also be applied to the first stage 97 of the register 96. Then, the counter 110 will step to its second position to interrogate the gate in line 28. Upon such interrogation there will be a signal on line 28 identifying the unknown character as an "F." The encoder 84 will again be triggered but in such a way as to provide a code on lines 86 identifying the unknown character as an F. Thus, the doubles storage 96 will be shifted to its next stage so that the "F" character identity data may be stored therein. The next operation is the stepping of counter 110 so that the gate in line 30 and those following are interrogated. There will be no signal on line 30 nor on the remaining character-identity lines.

We now have a "doubles" identified as an E and an F, and this information is successively available on lines 100 when the storage register 96 is unloaded by operating the shift multivibrator 102.

I stated previously that I have shown two ways to determine the two or more characters which cause the doubles situation. One is described above, and the other is shown in FIGURE 3. This figure is the same as FIGURE 1 except for the gating 106*a* which replaces gates 106 and an additional flip flop 140. Where the system of FIGURE 1 requires interrogation of gates 106 after each character is scanned, the system of FIGURE 3 allows the character identity signals on lines 126–132 from comparator 124 to pass to coder 184 provided that only one line conducts a character-identity signal during a "read" signal. It is only when the doubles detector provides a signal on line 44*a*, 44*b* that the gating 106*a* is used.

Gating 106*a* consists of a group of inhibit gates 106*b*, one interposed in each line 126, 128, etc. between the comparator 124 and coder 184. The inhibit signal on line 142 for each gate is provided by flip flop 140, and this does not become set unless there is a doubles signal from detector 144. When there is a doubles signal, all gates 106*b* are inhibited by the signal on line 142, and the ring counter 110*a* is cycled by a signal on line 142*a*. Lines 108*a* are attached to the respective stages of counter 110*a* and each forms an input to an AND gate of the group of gates 106*c*. The other input to each gate 106*c* is a line 106*d* connected to the lines of group 126, 128, 130, etc. ahead of the inhibit gate 106*b* therein.

The output of each gate 106c is on a line 106e connected to a character-identity line, e.g., line 126, behind its inhibit gate. Stated briefly, gates 106c are connected to lines 126, 128, etc. in parallel with the inhibit gates 106b.

Figure 3:
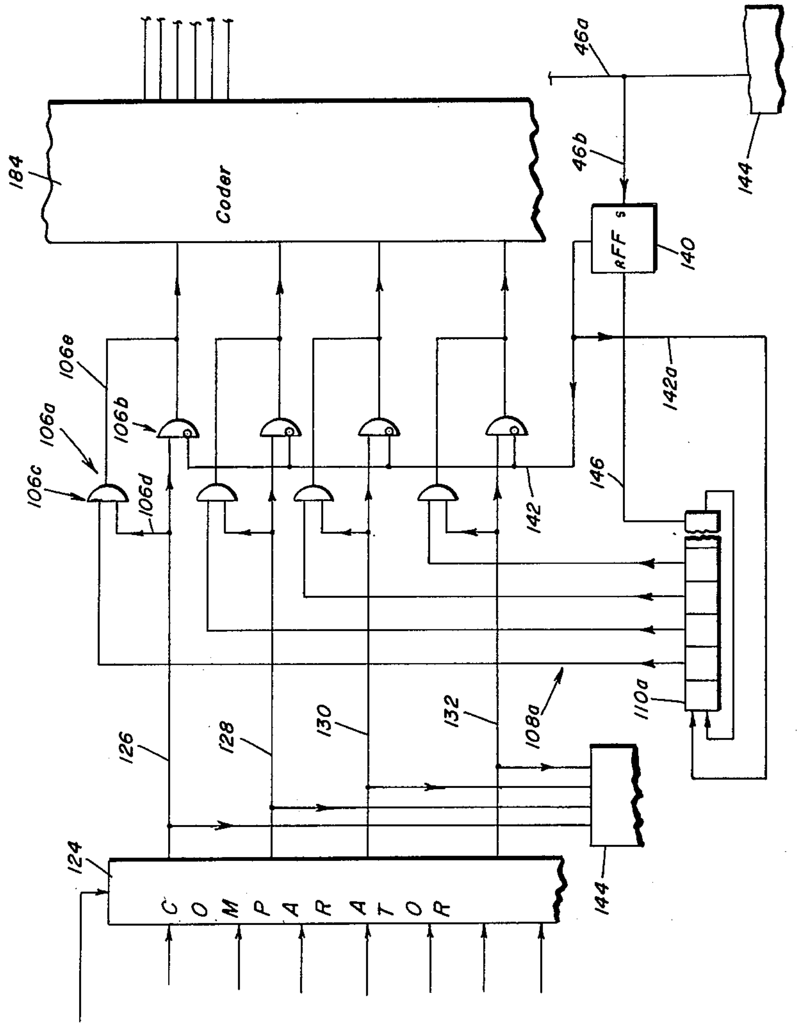
FIGURE 3 is a fragmentary view showing a modification.

The operation of the system shown in FIGURE 3 is now obvious. As long as the machine reads without a doubles error, one of the lines 126, or 128, etc., conducts a character-identity signal to the coder 184 through the inhibit gates interposed therein. When there is a doubles signal, the flip flop 140 is set and its output on line 142 inhibits gates 106b and starts the counter cycle. As the counter steps the successive gates 106c are interrogated (effectively interrogating lines 126, 128, 130, etc., for character-identity signals), and the signals on the two or more lines are gated (by gates 106c) into the coder 184. The last stage of counter 110a is used to reset the flip flop 140 by a signal on line 146.

Various changes, modifications, etc., may be made without departing from the protection of the following claims.

I claim:

1. In a reading machine to identify individual characters of a set, said machine comprising; a comparator provided with inputs which represent the various possible characters when the machine endeavors to identify an unknown character of said set, said comparator having a separate output line for each character that the machine is capable of identifying, said comparator providing an output signal on a predetermined line when the machine identifies the character, and said comparator providing outputs on additional lines when the comparator determines that the unknown character can be two or more possible characters and not any of the other characters of the set, and means responsive to outputs on more than one of said lines to provide a doubles signal indicating that the comparator has determined that the identify of the unknown character is ambiguous but is one of said two or more possible characters of the set.

2. The subject matter of claim 1 and means to remember the identity of each of said two or more possible characters.

3. The subject matter of claim 1 and an encoder actuated by signals on said output lines to provide character-identity codes, and means responsive to said doubles signal to inhibit said character-identity codes.

4. The subject matter of claim 3 and a memory device associated with the outputs of said encoder to remember said character-identity codes.

5. In a reading machine for examining and identifying characters of a set, said machine comprising; a comparator which has a separate output line for each character of the set, said comparator providing a signal on one of said lines to identify an examined character, and a detector associated with said lines to provide a doubles signal when more than one of said lines conduct a separate character-identity signal for the same examined character.

6. In a character reading machine to identify characters of a set, wherein the machine has a source of character-identity signals on separate lines for different characters of the set, the improvement comprising means responding to the signals on said lines to provide a doubles signal indicating the presence of concurrent signals on more than one of said lines, thereby providing the information that said source indicated that the unknown character of the set is too similar to more than one character to be positively identified.

7. The machine of claim 6 and means connected with said source to adjust the tolerance required between incoming signals to the source which will cause said source to provide outputs on more than one of said separate lines.

8. The reading machine of claim 6 and means to remember the identity of the characters represented by said concurrent signals on more than one of said separate lines.

9. In a reading machine to examine and identify characters of a set, said machine comprising; a comparator, means for providing incoming signals extracted from an unknown character of the set to said comparator of a value which corresponds to the degree of match between the unknown character and separate criterion for each of the characters which the machine can identify, individual output means associated with the comparator, one of said output means conducting a character-identity signal as a result of said comparator selecting the best match of the incoming signals with said criteria, detection means connected with all of said output means and providing a doubles signal in response to concurrent signals on more than one of said output means, means to identify the characters represented by the concurrent signals on said more than one output means, and means connected with said output means for conducting the character-identity signals to a utilization device when only one of said output means conducts a signal at one time.

10. In an optical character reading machine; a comparator providing outputs on individual character-identity lines, there being one line for each character; a detector including an adder circuit for providing a signal indicating that more than one line is concurrently conducting a character-identity signal; and means to determine the identity of the characters represented by each of said concurrent signals.

11. In an optical character reading machine; a comparator providing outputs on individual character-identity lines, there being one line for each character; a detector including an adder circuit, for providing a signal indicating that more than one line is concurrently conducting a character-identity signal; means to determine the identity of the characters represented by said concurrent signals, said determining means including an encoder; and means to gate the signals on said lines into said encoder to provide coded character-identity signals as outputs of the encoder for each gated input signal.

12. The machine of claim 11, and means for remembering said coded character-identity signals to make them available for further use.

13. A reading machine providing output signals by which an unknown pattern of a set may be identified comprising; a detector providing an output signal indicating that the decision of the reading machine is that the unknown pattern is so similar to more than one criteria that the unknown pattern is one of a plurality of patterns but less than the entire set, encoding means operatively associated with the pattern-identity outputs to encode each output, and means for remembering the identity of the encoded patterns.

14. A reading machine for examining and identifying characters, the reading machine having a plurality of output lines comprising one line corresponding to each character that the machine is expected to identify, means connected with said lines to provide a doubles signal in response to character-identity signals on more than one of said lines, a memory device, and means to interrogate said lines and conduct the character-identity signals thereon to said memory device thereby storing the identity of the characters which were represented on said plurality of lines.

References Cited by the Examiner

UNITED STATES PATENTS

| | | | |
|---|---|---|---|
| Re. 23,601 | 12/52 | Hamming | 340—146.1 |
| 2,897,480 | 7/59 | Kumagai | 340—146.1 |

MALCOLM A. MORRISON, *Primary Examiner.*